United States Patent
Levy (10) Patent No.: US 10,543,797 B2
(45) Date of Patent: Jan. 28, 2020

(54) BUMPER USED IN A MOTORIZED VEHICLE (71) Applicant: Brett A. Levy, Spencer, IN (US)

(72) Inventor: Brett A. Levy, Spencer, IN (US)

(*) Notice: Subject to any disclaimer, the term of this patent is extended or adjusted under 35 U.S.C. 154(b) by 0 days.

(21) Appl. No.: 16/119,889

(22) Filed: Aug. 31, 2018

(65) Prior Publication Data

US 2019/0071041 A1 Mar. 7, 2019

Related U.S. Application Data

(60) Provisional application No. 62/553,233, filed on Sep. 1, 2017.

(51) Int. Cl.
*B60R 19/38* (2006.01)
*B60R 19/03* (2006.01)

(52) U.S. Cl.
CPC .............. *B60R 19/38* (2013.01); *B60R 19/03* (2013.01)

(58) Field of Classification Search
CPC ............ B60R 19/38; B60R 19/03; B62K 5/01
USPC ........................................................ 296/120
See application file for complete search history.

(56) References Cited

U.S. PATENT DOCUMENTS

| | | | | |
|---|---|---|---|---|
| 6,102,413 A * | 8/2000 | Khennache | ............. | B62B 17/02 280/28 |
| 6,547,027 B1 * | 4/2003 | Kalhok | ...................... | B62J 1/12 180/210 |
| 6,626,260 B2 * | 9/2003 | Gagnon | ................. | B60K 15/01 180/215 |
| 7,658,258 B2 * | 2/2010 | Denney | .................. | B62D 21/08 180/311 |
| 7,669,678 B2 * | 3/2010 | Benedict | .................. | B62J 15/00 180/89.1 |
| 7,677,343 B2 * | 3/2010 | Kitai | ........................ | B60K 5/12 180/291 |
| 7,891,455 B2 * | 2/2011 | Feutz | ..................... | B62K 13/04 180/210 |
| 8,783,720 B2 * | 7/2014 | Davis | ....................... | B60G 3/06 180/210 |
| 9,187,128 B2 * | 11/2015 | Koberstein | .............. | B62K 5/01 |

FOREIGN PATENT DOCUMENTS

JP 2007069672 A * 3/2007

* cited by examiner

*Primary Examiner* — Pinel E Romain (57) ABSTRACT

A retrofitting bumper that is intended to be used in motorsports and in the vehicular industry consists of a main structural bar, a first pair of support bars, and a second pair of support bars. Preferably, the main structural bar is manufactured from ultra-high-molecular-weight polyethylene (UHMWPE) so that the memory shape behavior allows the main structural bar to retain the original shape even after impact. The first pair of support bars and the second pair of support bars are terminally and angularly mounted along a structural body of the main structural bar. A fastening mechanism, a first pair of attachment brackets, and a second pair of attachment brackets are used to mount the main structural bar, the first pair of support bars, and the second pair of support bars onto the frame of the ATV.

12 Claims, 7 Drawing Sheets

BUMPER USED IN A MOTORIZED VEHICLE

The current application claims a priority to the U.S. Provisional Patent application Ser. No. 62/553,233 filed on Sep. 1, 2017.

FIELD OF THE INVENTION

The present invention relates generally to motorized vehicles. More particularly, the present invention relates to a retrofitting bumper that is intended to be used in motorsports and in the vehicular industry. The materialistic properties of the present invention help ensure that both the rider and the vehicle are protected upon impact.

BACKGROUND OF THE INVENTION

A bumper is a structure attached to or integrated with the front and rear ends of a motor vehicle, to absorb impact in a minor collision, ideally minimizing repair costs. The present invention introduces a bumper that can be used in motorsports and in the vehicular industry.

The preferred embodiment of the present invention is intended to be used on an all-terrain vehicle (ATV). Retrofitting certain accessories is a common practice to protect the ATV from being damaged during use. Bumpers are amongst the most common accessories that are retrofitted to the ATV. Even though existing ATV bumpers provide sufficient protection, there are notable drawbacks to these existing bumpers.

When a bumper is used on an ATV, the bumper is expected to reduce the damage that can be caused to the ATV and the rider of the ATV. To do so, a majority of the existing retrofitting bumpers are designed to be indestructible. Even though these bumpers prevent the ATV from contacting an obstacle directly, the rigidity of the bumper can damage the frame of the ATV upon impact. Replacing or repairing the frame of the ATV can be costly and time consuming.

To prevent rigid bumpers from damaging the frame of the ATV, users tend to purchase bumpers that fold, bend, or break upon impact. Even though the frame is not damaged by using these bumpers, the need to continuously replace the bumper can be financially disadvantageous to the user. Considering the flaws of the existing bumpers, the need for a bumper that absorbs the force from an impact and prevents the force from transferring to the ATV or the user is clear.

The objective of the present invention is to address the issues mentioned above. To do so, the present invention introduces a retrofitting bumper made of ultra-high-molecular weight polyethene (UHMWPE). The materialistic properties of the present invention absorb the force upon impact and prevents the frame of the ATV from being damaged. The materialistic properties also prevent the force from being transferred onto the rider of the ATV. Since the present invention has a collapsed configuration and an expanded configuration, the need to replace the bumper is eliminated.

DETAIL DESCRIPTIONS OF THE INVENTION

All illustrations of the drawings are for the purpose of describing selected versions of the present invention and are not intended to limit the scope of the present invention.

The present invention introduces a bumper that is intended to be used in motorsports and the vehicular industry in general. The preferred embodiment of the present invention is intended to be used with an all-terrain vehicle (ATV). The present invention is intended to absorb the force from an impact without transferring the force of the impact to the frame of the ATV or the rider of the ATV. The materialistic properties ensure that the present invention can be reused even after impact.

As illustrated in FIGS. 1-5, to fulfill the intended functionalities, the present invention comprises a main structural bar 1, a first pair of support bars 9, and a second pair of support bars 11. In the preferred embodiment of the present invention, the main structural bar 1 is manufactured from ultra-high-molecular-weight polyethylene (UHMWPE) and functions as the main contact point upon impact. However, other comparable material can be used in other embodiments of the present invention. The shape memory behavior of UHMWPE allows the user to reuse the present invention even after impact. When a force is applied on the main structural bar 1 by contacting an external surface, the UHMWPE creates a temporary shape by deforming the original shape of the main structural bar 1. When an external stimulus is applied to the temporary shape, the main structural bar 1 undergoes a recovery process. The UHMWPE allows the original shape of the main structural bar 1 to be retained when the recovery process is complete.

The main structural bar 1 is attached to the ATV through the first pair of support bars 9 and the second pair of support bars 11 that are attached to a frame of the ATV. Additionally, the first pair of support bars 9 and the second pair of support bars 11 absorb a portion of the force upon impact. The first pair of support bars 9 and the second pair of support bars 11 can also be manufactured from UHMWPE for force absorbing purposes. The size and the overall shape of the main structural bar 1, the first pair of support bars 9, and the second pair of support bars 11 can vary in different embodiments of the present invention.

Figure 1:
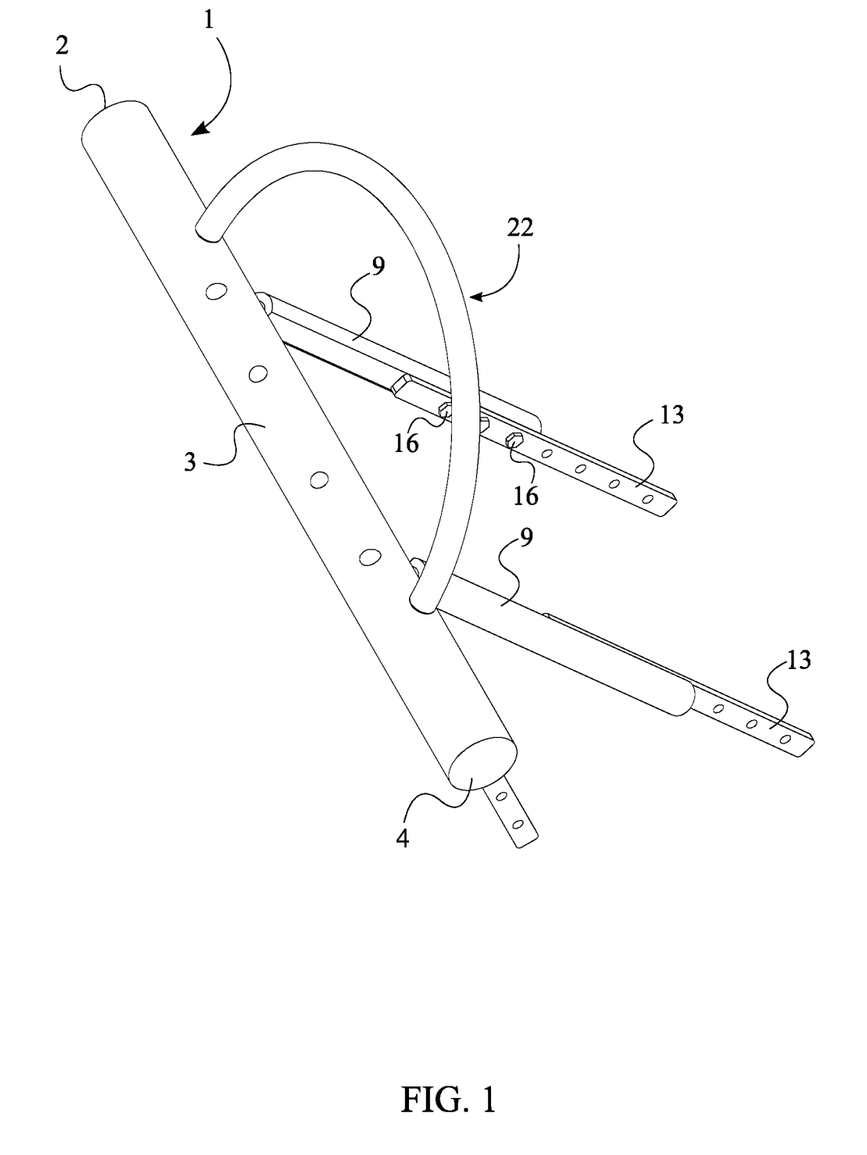
FIG. 1 is a perspective view of the present invention.
Figure 2:
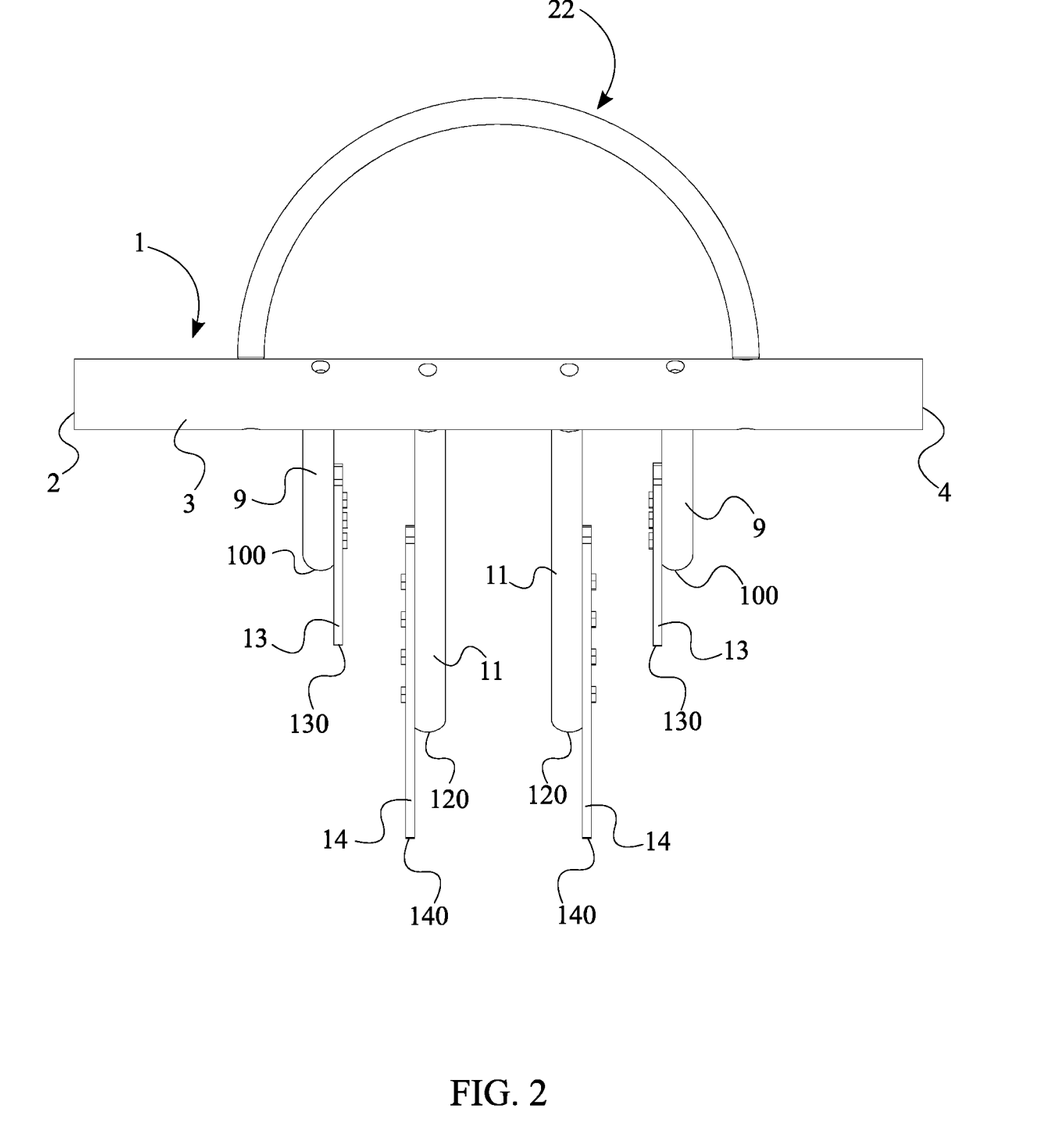
FIG. 2 is a front view of the present invention.
Figure 3:
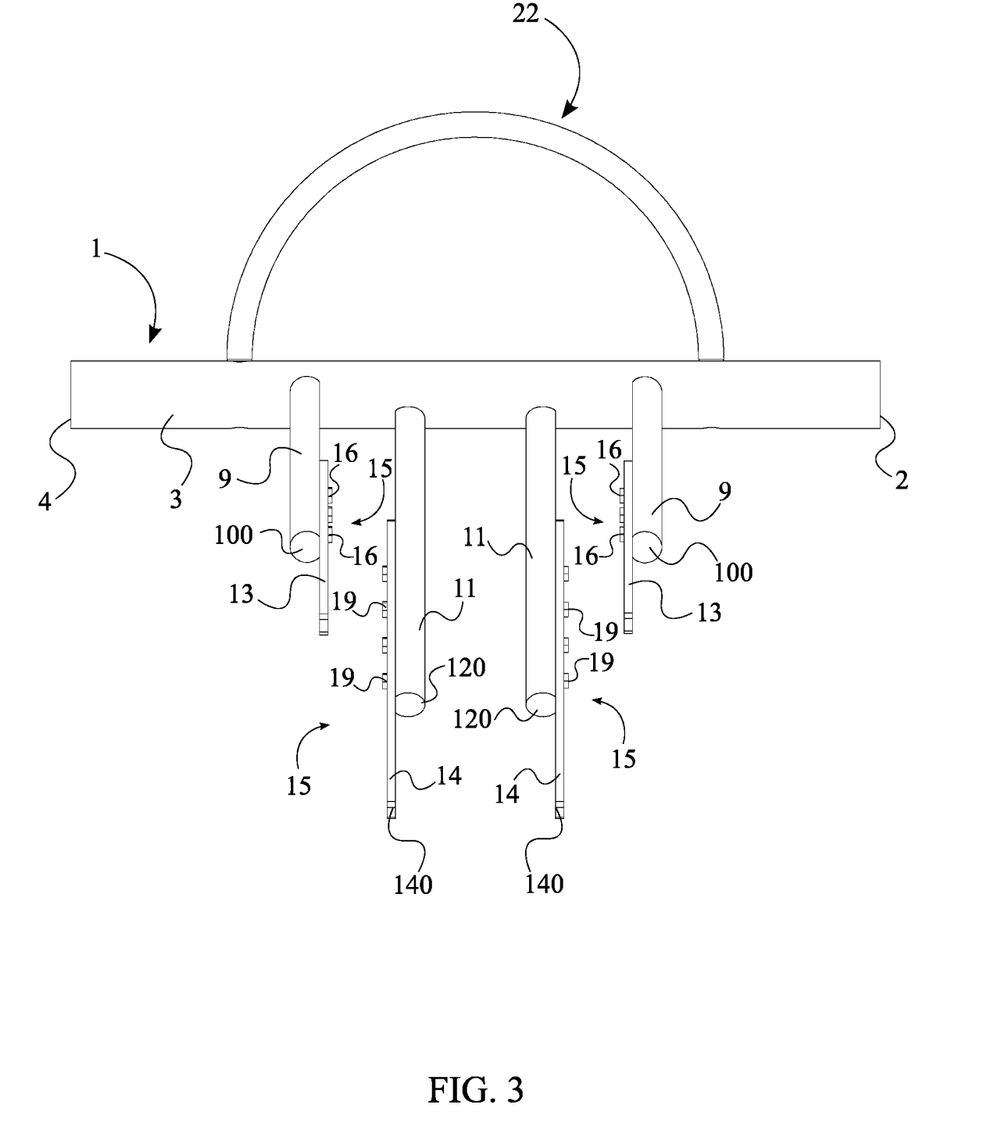
FIG. 3 is a rear view of the present invention.
Figure 6:
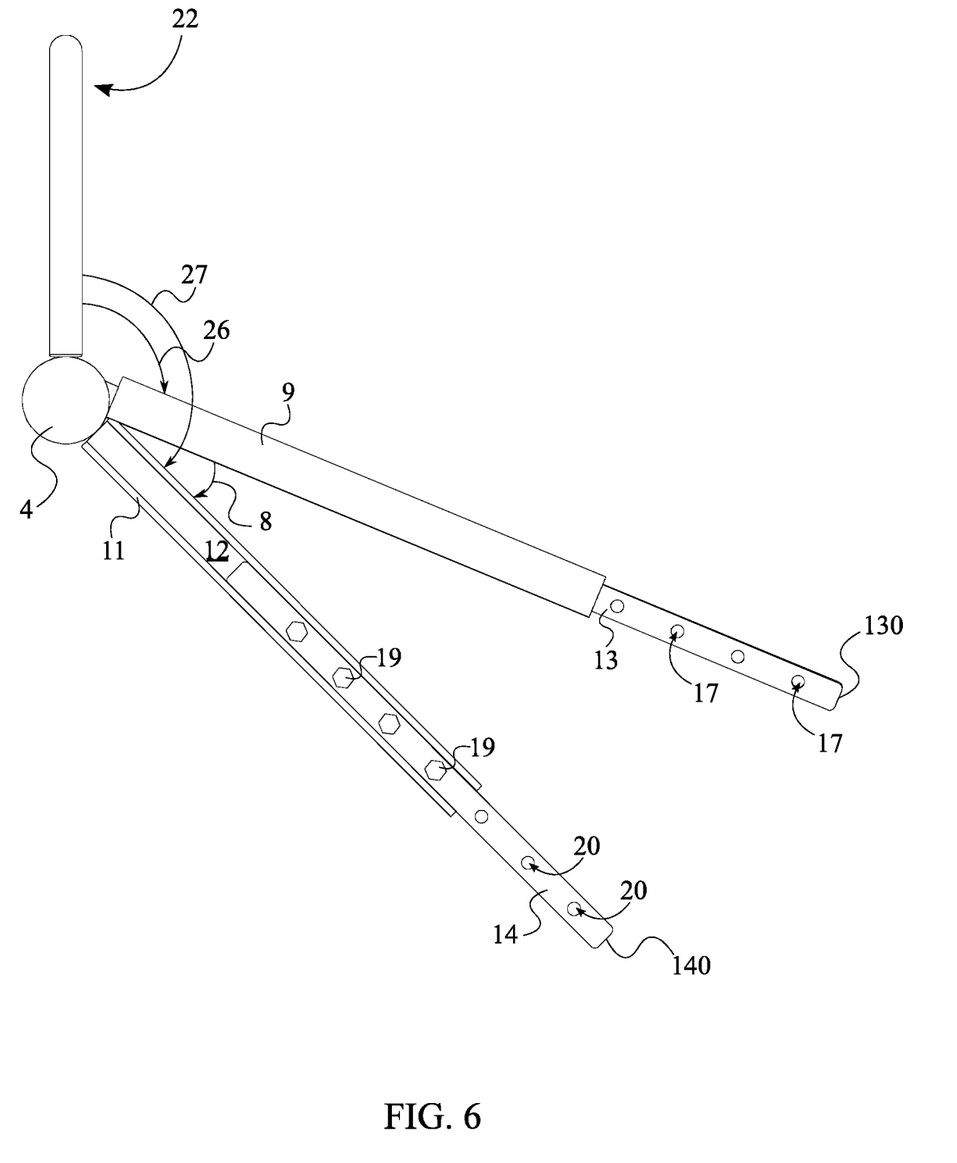
FIG. 6 is a side view of the present invention.

As seen in FIGS. 1-3, the main structural bar 1, which is cylindrical in shape in the preferred embodiment, comprises a first end 2, a structural body 3, and a second end 4. The structural body 3 extends from the first end 2 to the second end 4 and determines the overall length of the main structural bar 1. To connect the main structural bar 1 and the frame of the ATV, the first pair of support bars 9 is terminally and angularly connected to the structural body 3. Opposite the structural body 3, the first pair of support bars 9 is terminally connected to the frame of the ATV. Each of the first pair of support bars 9 is offset to each other along the structural body 3 for force distribution purposes and structural support. Similar to the first pair of support bars 9, the second pair of support bars 11 is also terminally and angularly connected to the structural body 3. Opposite the structural body 3, the second pair of support bars 11 is terminally connected to the frame of the ATV. Each of the second pair of support bars 11 is also offset to each other along the structural body 3 for force distribution purposes and for providing structural support. To establish a connection with the frame of the ATV, the second pair of support bars 11 is positioned in between each of the first pair of support bars 9. Moreover, as seen in FIG. 6, the second pair of support bars 11 is oriented at an attachment angle 8 from the first pair of support bars 9, wherein the attachment angle 8 is an acute angle.

Figure 4:
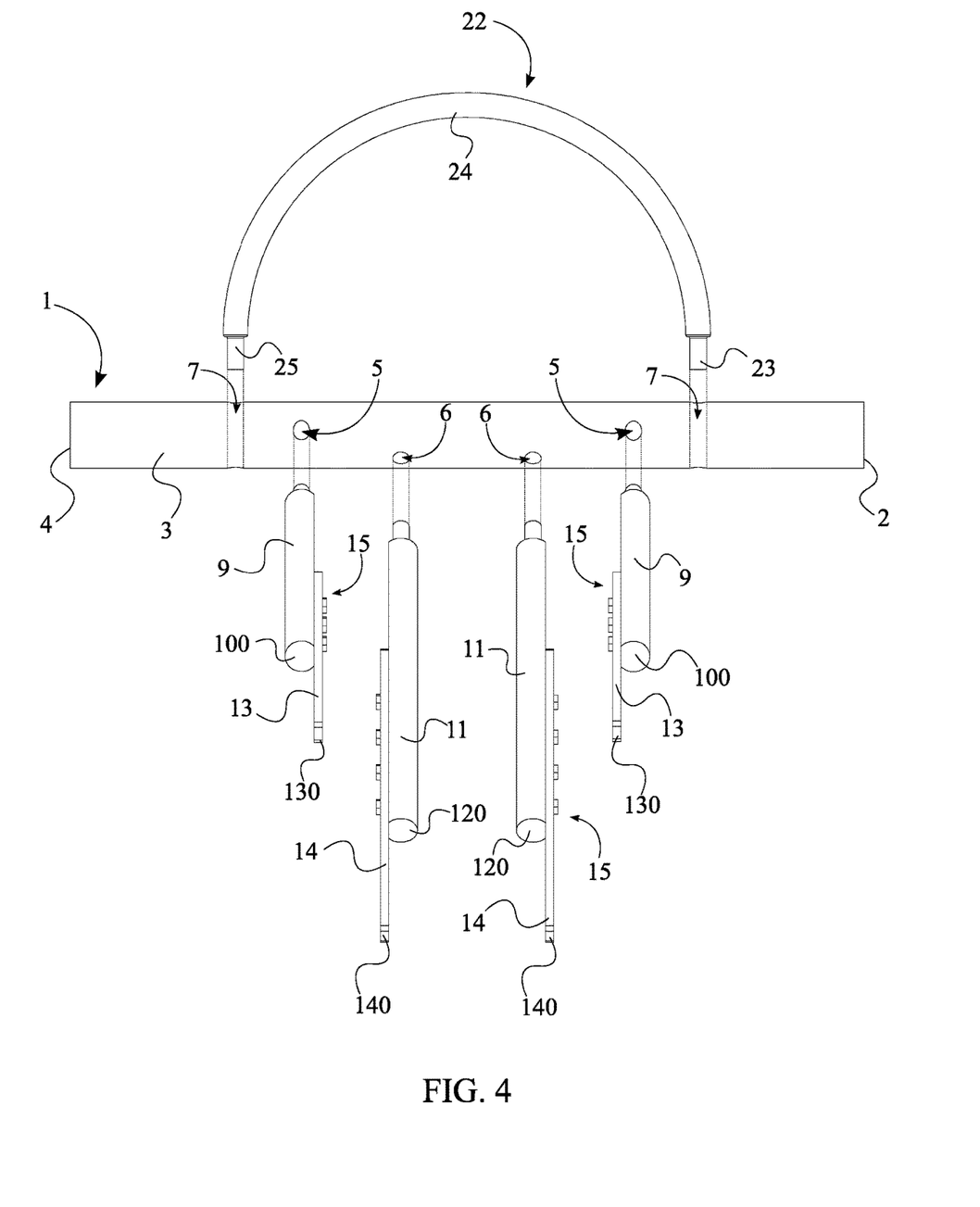
FIG. 4 is a rear exploded view of the present invention.

As seen in FIG. 4, for the first pair of support bars 9 and the second pair of support bars 11 to connect to the main structural bar 1 appropriately, the main structural bar 1 further comprises a first pair of receiving holes 5 and a second pair of receiving holes 6. The first pair of receiving holes 5 traverses into the structural body 3 so that each of the first pair of support bars 9 can be terminally mounted to a corresponding hole of the first pair of receiving holes 5. Likewise, the second pair of receiving holes 6 traverses into the structural body 3 in between each of the first pair of receiving holes 5. Each of the second pair of support bars 11 is terminally mounted to a corresponding hole of the second pair of receiving holes 6. To position the second pair of support bars 11 at the attachment angle 8 from the first pair of support bars 9, the second pair of receiving holes 6 is oriented at the attachment angle 8 from the first pair of receiving holes 5. The first pair of support bars 9 and the second pair of support bars 11 can be connected to the main structural bar 1 through a connector or other comparable mechanism.

Figure 5:
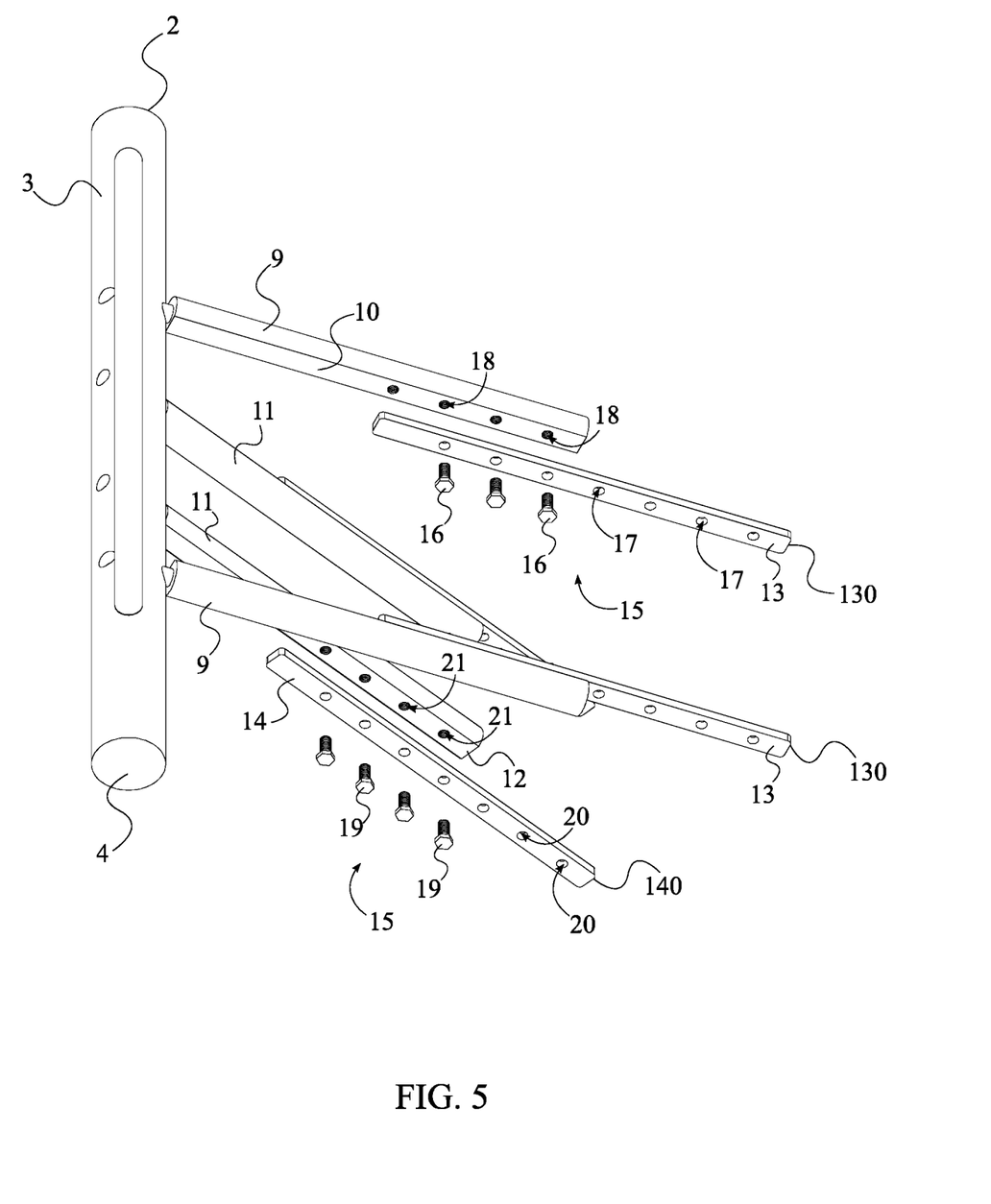
FIG. 5 is another perspective view of the present invention illustrating the fastening mechanism.

As seen in FIGS. 3-5, to connect the first pair of support bars 9 and the second pair of support bars 11 to the ATV, the present invention further comprises a first pair of attachment brackets 13 and a second pair of attachment brackets 14. Each of the first pair of attachment brackets 13 is adjustably positioned along an internal lateral surface 10 of a corresponding support bar from the first pair of support bars 9. In doing so, an attaching end 130 of each of the first pair of attachment brackets 13 is offset from a free end 100 of each of the first pair of support bars 9. When the present invention is mounted onto the ATV, the first pair of attachment brackets 13 is positioned in between the frame of the ATV and the first pair of support bars 9.

As further illustrated in FIGS. 3-5, the second pair of attachment brackets 14 is used to connect the second pair of support bars 11 to the ATV. To do so, each of the second pair of attachment brackets 14 is adjustably positioned along an external lateral surface 12 of a corresponding support bar of the second pair of support bars 11. In doing so, a connecting end 140 of each of the second pair of attachment brackets 14 is offset from an open end 120 of each of the second pair of support bars 11. When the present invention is mounted onto the ATV, the second pair of attachment brackets 14 is positioned in between the frame of the ATV and the second pair of support bars 11.

As illustrated in FIG. 5, the present invention further comprises a fastening mechanism 15 that is used to adjustably position the first pair of attachment brackets 13 and the second pair of attachment brackets 14. More specifically, each of the first pair of attachment brackets 13 is mounted onto each of the first pair of support bars 9 through the fastening mechanism 15. Likewise, each of the second pair of attachment brackets 14 is mounted onto each of the second pair of support bars 11 through the fastening mechanism 15. The fastening mechanism 15 can vary in different embodiments of the present invention.

As seen in FIG. 5, in the preferred embodiment of the present invention, the fastening mechanism 15 comprises a first plurality of fasteners 16, a first plurality of bracket apertures 17, and a first plurality of support bar apertures 18 that are used to attach the first pair of attachment brackets 13 to both the first pair of support bars 9 and the ATV. To do so, each of the first plurality of bracket apertures 17 traverses through a body of each of the first pair of attachment brackets 13, and the first plurality of bracket apertures 17 is distributed equidistantly along the body of each of the first pair of attachment brackets 13. To correspond with the first plurality of bracket apertures 17, each of the first plurality of support bar apertures 18 equidistantly traverses through a body of each of the first pair of support bars 9 at the inner lateral surface 10. At least one bracket aperture from the first plurality of bracket apertures 17 is concentrically aligned with at least one support bar aperture from the first plurality of support bar apertures 18. An arbitrary fastener selected from the first plurality of fasteners 16 is positioned into the at least one bracket aperture and the at least one support bar aperture so that a bracket from the first pair attachment brackets 13 is connected to a support bar from the first pair of support bars 9.

As further illustrated in FIG. 5, the fastening mechanism 15 further comprises a second plurality of fasteners 19, a second plurality of bracket apertures 20, and a second plurality of support bar apertures 21 that are used to attach the second pair of attachment brackets 14 to both the second pair of support bars 11 and the ATV. Each of the second plurality of bracket apertures 20 traverses through a body of each of the second pair of attachment brackets 14, and the second plurality of bracket apertures 20 is distributed equidistantly along the body of each of the second pair of attachment brackets 14. To correspond with the second plurality of bracket apertures 20, each of the second plurality of support bar apertures 21 equidistantly traverses through a body of each of the second pair of support bars 11 at the external lateral surface 12. At least one bracket aperture from the second plurality of bracket apertures 20 is concentrically aligned with at least one support bar aperture from the second plurality of support bar apertures 20. An arbitrary fastener from the second plurality of fasteners 19 is positioned into the at least one bracket aperture and the at least one support bar aperture. Thus, a bracket from the second pair of attachment brackets 14 is connected to a support bar from the second pair of support bars 11.

To provide additional protection to the ATV and the rider, the present invention further comprises a grab bar 22 which can vary in size and overall shape in different embodiments of the present invention. As seen in FIG. 4, in the preferred embodiment, the grab bar 22 comprises a first mounting end 23, a C-shaped body 24, and a second mounting end 25. The C-shaped body 24 extends from the first mounting end 23 to the second mounting end 25. To attach the grab bar 22 to the main structural bar 1 at the first mounting end 23 and the second mounting end 25, the main structural bar 1 further comprises a third pair of receiving holes 7 that traverses into the structural body 3. The first mounting end 23 is mounted into a corresponding hole from the third pair of receiving holes 7 adjacent the first end 2. Likewise, the second mounting end 25 is mounted into a corresponding hole from the third pair of receiving holes 7 adjacent the second end 4. When mounted, as shown in FIG. 6, the first pair of support bars 9 will be oriented at a first obtuse angle 26 from the grab bar 22. On the other hand, the second pair of support bars 11 will be oriented at a second obtuse angle 27 from the grab bar 22. The positioning of the first pair of support bars 9 and the second pair of support bars 11 is such that, the second obtuse angle 27 is greater than the first obtuse angle 26.

Figure 7:
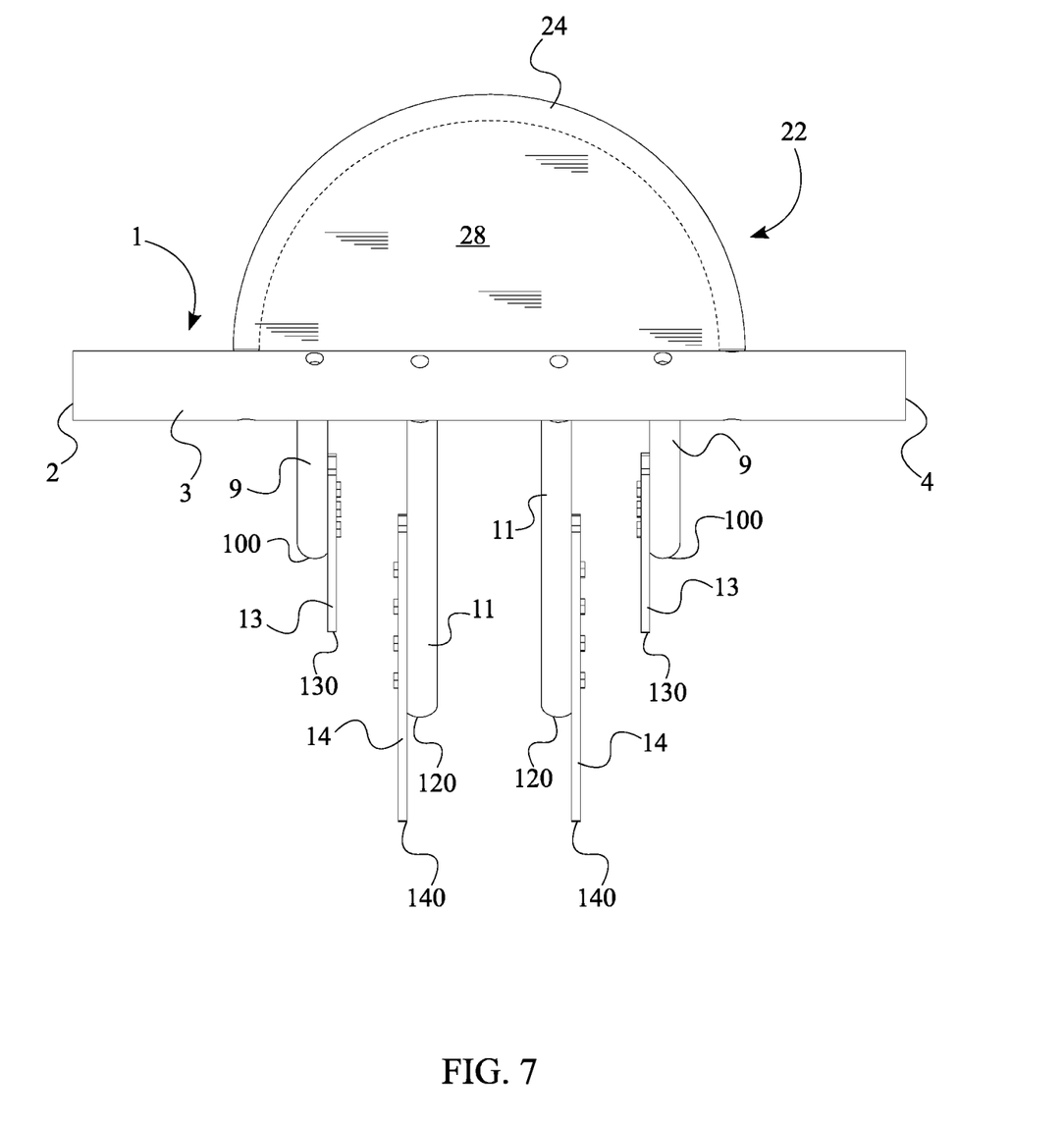
FIG. 7 is a front view of the present invention, wherein the display pad is illustrated.

When the grab bar 22 is mounted onto the main structural bar 1, the C-shaped body 24 forms a receiving space in between the grab bar 22 and the main structural bar 1. As illustrated in FIG. 7, to display ATV related information or other identification information in the receiving space, in some embodiments the present invention may further comprise a display pad 28 that is mounted along the C-shaped body 24. When mounted along the C-shaped body 24, and when the grab bar 22 is mounted onto the main structural bar 1, the display pad 28 is positioned in between the C-shaped body 24 and the structural body 3. Moreover, the display pad 28 is also positioned in between each of the third pair of receiving holes 7.

When the present invention is in use, the following process flow is generally followed. Initially, the first pair of attachment brackets 13 is mounted along the internal lateral surface 10 of each of the first pair of support bars 9 with the fastening mechanism 15. Next, the second pair of attachment brackets 14 is attached along the external lateral surface 12 of each of the second pair of support bars 11 with the fastening mechanism 15. The first pair of attachment brackets 13 and the second pair of attachment brackets 14 are then mounted onto the frame of the ATV with the fastening mechanism 15. Thus, the main structural bar 1, the first pair of support bars 9, and the second pair of support bars 11 are all mounted onto the ATV through the first pair of attachment brackets 13 and the second pair of attachment brackets 14.

Although the invention has been explained in relation to its preferred embodiment, it is to be understood that many other possible modifications and variations can be made without departing from the spirit and scope of the invention as hereinafter claimed.

What is claimed is:
1. A bumper comprises:
the bumper being configured to be used in a motorized vehicle;
a main structural bar;
a first pair of support bars;
a second pair of support bars;
the main structural bar comprises a first end, a structural body, and a second end;
the structural body extending from the first end to the second end;
the first pair of support bars being terminally and angularly connected to the structural body;
each of the first pair of support bars being offset to each other along the structural body;
the second pair of support bars being terminally and angularly connected to the structural body;
each of the second pair of support bars being offset to each other along the structural body;
the second pair of support bars being positioned in between each of the first pair of support bars;
the second pair of support bars being oriented at an attachment angle from the first pair of support bars, wherein the attachment angle is an acute angle;
a grab bar;
the main structural bar further comprises a third pair of receiving holes;
the grab bar comprises a first mounting end, a C-shaped body, and a second mounting end;
the C-shaped body extending from the first mounting end to the second mounting end;
the third pair of receiving holes traversing into the structural body;
the first mounting end being mounted into a corresponding hole from the third pair of receiving holes; and
the second mounting end being mounted into a corresponding hole from the third pair of receiving holes.

2. The bumper as claimed in claim 1 further comprises:
the main structural bar further comprises a first pair of receiving holes and a second pair of receiving holes;
the first pair of receiving holes traversing into the structural body;
the second pair of receiving holes traversing into the structural body in between each of the first pair of receiving holes;
each of the first pair of support bars being terminally mounted to a corresponding hole of the first pair of receiving holes; and
each of the second pair of support bars being terminally mounted to a corresponding hole of the second pair of receiving holes.

3. The bumper as claimed in claim 1, wherein the main structural bar is manufactured from Ultra-high-molecular-weight polyethylene (UHMWPE).

4. The bumper as claimed in claim 1, wherein the first pair of support bars is manufactured from Ultra-high-molecular-weight polyethylene (UHMWPE).

5. The bumper as claimed in claim 1, wherein the second pair of support bars is manufactured from Ultra-high-molecular-weight polyethylene (UHMWPE).

6. The bumper as claimed in claim 1 further comprises:
a first pair of attachment brackets;
a second pair of attachment brackets;
each of the first pair of attachment brackets being adjustably positioned along an internal lateral surface of a corresponding support bar of the first pair of support bars;
an attaching end of each of the first pair of attachment brackets being offset from a free end of each of the first pair of support bars;
each of the second pair of attachment brackets being adjustably positioned along an external lateral surface of a corresponding support bar of the second pair of support bars; and
a connecting end of each of the second pair of attachment brackets being offset from an open end of each of the second pair of support bars.

7. The bumper as claimed in claim 6 further comprises:
a fastening mechanism;
each of the first pair of attachment brackets being mounted onto each of the first pair of support bars with the fastening mechanism; and
each of the second pair of attachment brackets being mounted onto each of the second pair of support bars with the fastening mechanism.

8. The bumper as claimed in claim 7 further comprises:
the fastening mechanism comprises a first plurality of fasteners, a first plurality of bracket apertures, and a first plurality of support bar apertures;
each of the first plurality of bracket apertures traversing through a body of each of the first pair of attachment brackets;
each of the first plurality of bracket apertures being equidistantly distributed along the body of each of the first pair of attachment brackets;
each of the first plurality of support bar apertures equidistantly traversing through an inner lateral surface of each of the first pair of support bars;
at least one bracket aperture from the first plurality of bracket apertures being concentrically aligned with at least one support bar aperture from the first plurality of support bar apertures; and
an arbitrary fastener from the first plurality of fasteners being positioned into the at least one bracket aperture and the at least one support bar aperture.

9. The bumper as claimed in claim 7 further comprises:
the fastening mechanism further comprises a second plurality of fasteners, a second plurality of bracket apertures, and a second plurality of support bar apertures;
each of the second plurality of bracket apertures traversing through a body of each of the second pair of attachment brackets;
each of the second plurality of bracket apertures being equidistantly distributed along the body of each of the second pair of attachment brackets;
each of the second plurality of support bar apertures equidistantly traversing through an external lateral surface of each of the second pair of support bars;
at least one bracket aperture from the second plurality of bracket apertures being concentrically aligned with at least one support bar aperture from the second plurality of support bar apertures; and
an arbitrary fastener from the second plurality of fasteners being positioned into the at least one bracket aperture and the at least one support bar aperture.

10. The bumper as claimed in claim 1, wherein a first pair of support bars is oriented at a first obtuse angle from the grab bar.

11. The bumper as claimed in claim 1, wherein a second pair of support bars is oriented at a second obtuse angle from the grab bar, wherein the second obtuse angle is greater than a first obtuse angle.

12. The bumper as claimed in claim 1 further comprises:
a display pad;
the display pad being mounted along the C-shaped body;
the display pad being positioned in between the C-shaped body and the structural body; and
the display pad being positioned in between each of the third pair of receiving holes.

* * * * *